Sept. 27, 1960  H. E. BOWERMAN  2,953,800
PIPE LINE PIGS
Filed Feb. 13, 1956  2 Sheets-Sheet 1
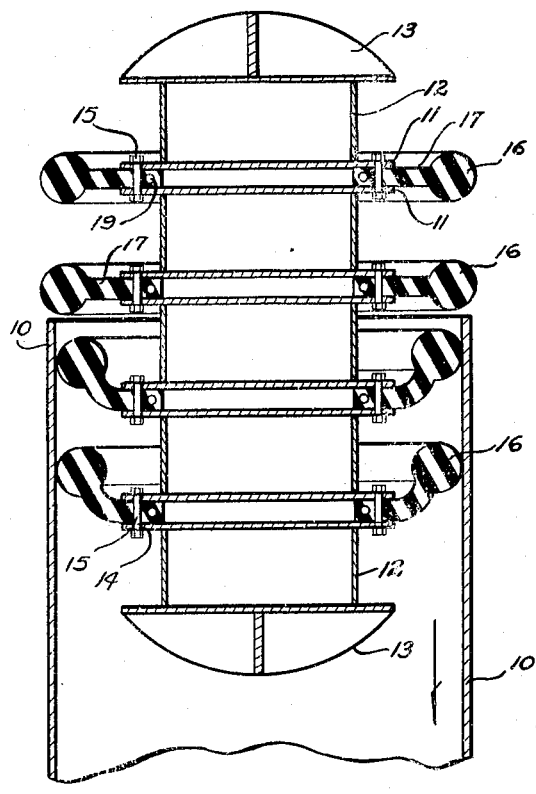
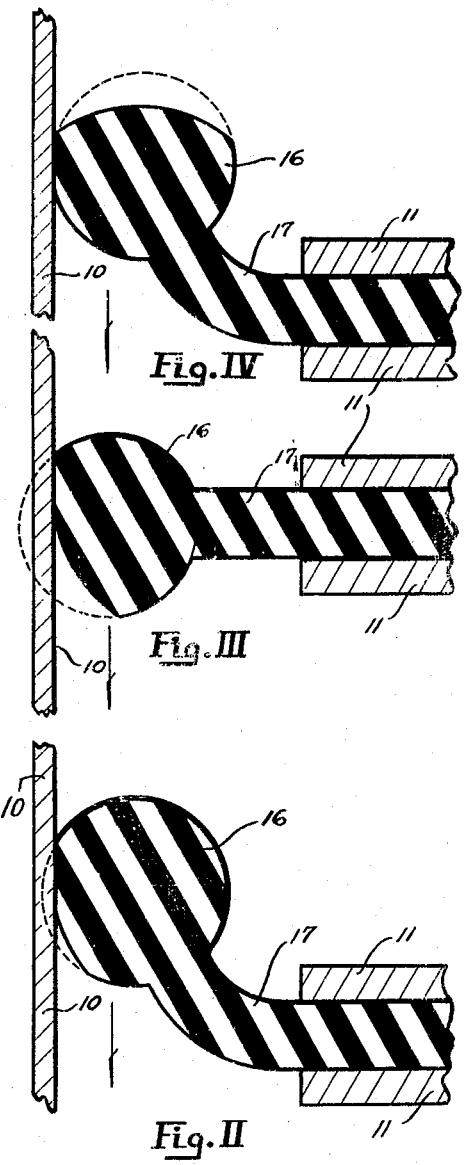
INVENTOR.
HULIE E. BOWERMAN Sept. 27, 1960    H. E. BOWERMAN    2,953,800
PIPE LINE PIGS
Filed Feb. 13, 1956    2 Sheets-Sheet 2
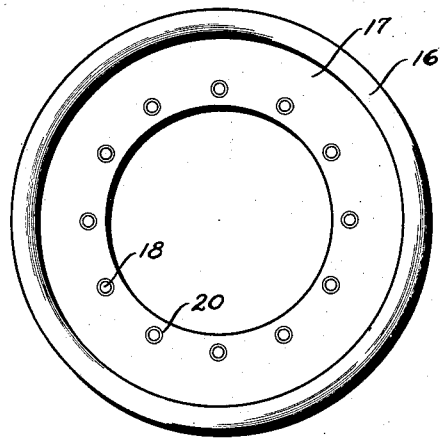
Fig. VII
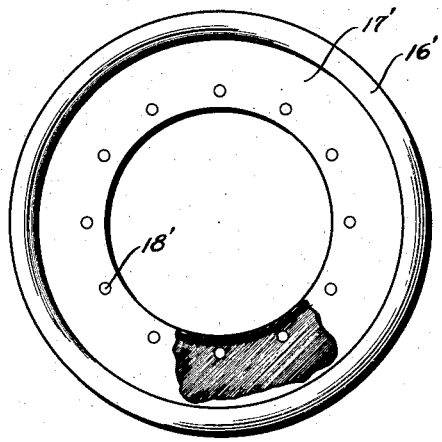
Fig. VIII
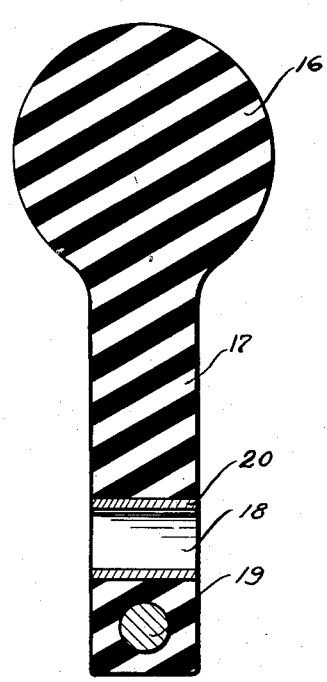
Fig. V
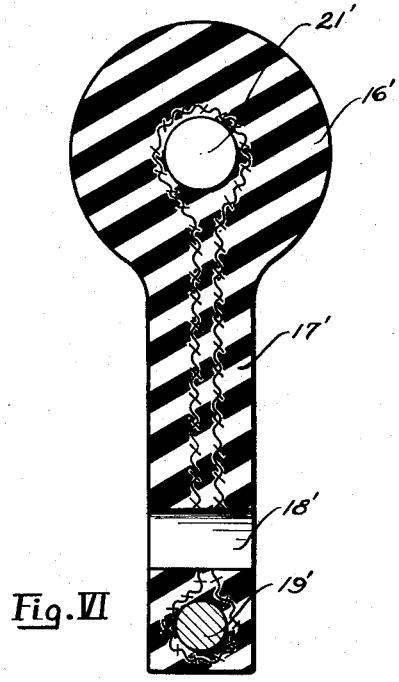
Fig. VI
INVENTOR.
HULIE E. BOWERMAN
BY *Jell Waldrop*
ATTY.

United States Patent Office 2,953,800
Patented Sept. 27, 1960

2,953,800

PIPE LINE PIGS

Hulie E. Bowerman, P.O. Box 126, Arlington, Tex.

Filed Feb. 13, 1956, Ser. No. 565,048

8 Claims. (Cl. 15—104.06)

This invention relates to what is commonly known as pipe line pigs and more particularly to improvements in rubber cups or drivers for such implements.

Heretofore it has been the practice to provide these pigs with scratchers or scrappers for removing rust, corrosive deposits, sedimentation and the like from the inner walls of gas or products lines and moving them along to places of discharge frequently known as traps or drains. The motive power for the pigs is gas, air, water, or even the other products liquids, it being essential that movable sealing elements be associated with the pig assembly whereby upon the occurrence of a pressure differential within the pipe the pig will be caused to travel in the direction of the lower of the pressures. Another common usage is to use the pig, which is also sometimes called a plug, to drive the water from a section of line after hydrostatic test by using gas or possibly air. Other uses are to drive moisture or other liquid condensate from gas lines. Still another common use is for separation of products moving through a given line.

In all such usage the rubber cups in optimum performance would maintain effective sealing contact with the inner face of the pipe. These rubber seals or drivers or separators have been made in cup shapes of varying depths and even in the form of flat disks. When these wear away, the contact is lost and the efficiency of the implement drops and soon disappears.

Frequently it is desirable or even necessary to reverse the movement of the pig perhaps to overcome an excess of debris or detrital which may impede or prevent its continuous movement in a given direction. This reversal of travel could usually be attained by reversal of direction of flow of the impelling medium in the line. Thus it is essential that the rubber elements be capable of properly functioning in either direction and without loss of sealing engagement with the pipe. Attempts to accomplish this in the past have included an assembly wherein some of the rubber cups were faced in both directions of possible travel. Such arrangements use double the amount of rubber required should movement all be in a single direction. Disks provide the minimum of life wear since they are not greatly responsive to pressures on their respective faces and are at most responsive as the pressures may vary and thus their efficiency and useful life are short. Cups may expand outwardly in response to the increase of pressure within the cup face over the pressure behind the cup, but since normal working pressure differentials on the faces of the sealing elements may be quite low, frequently five to ten pounds p.s.i., little sealing distortion of the rubber elements is attained. In all these situations efficiencies are low and when a minimum of wearing of the parts occurs are lost altogether.

My invention provides a rubber sealing element overcoming all these defects and greatly simplifying assembly and operation with maximum efficiency over a greater useful operating life of the pig assembly.

I provide a rubber sealing element whose outer and wearing portion is preferably in the form of an O ring bonded to a thinner and more flexible inner section, the latter being adapted to receive and be attached to a suitable form of assembly mechanism which commonly is of metal but might be of a harder section of rubber or the like than the sealing element.

Those skilled in the art will readily comprehend the invention from the following description together with the accompanying drawings in which:

Figure I shows a schematic cross-sectional view of a pig assembly entering a pipe section;

Figure II shows a rubber element of Figure I partially worn away;

Figure III shows the rubber element of Figure II after having been subjected to further wear;

Figure IV shows the rubber element of Figure III in reverse directional position;

Figure V shows an enlarged cross section of the rubbers shown in Figure I;

Figure VI shows a modified form of the rubber of Figure V;

Figure VII is an elevation reduced in size, of the rubber of Figure V; and

Figure VIII is an elevation, reduced in size, of the rubber of Figure VI with a part broken away.

In the various figures like references denote similar elements wherein 10 is a section of pipe to be serviced. 11—11 are retainer plates on the ends of body sections 12 of the assembly. Some of the body sections 12 preferably have nose or bumper sections 13 for facilitating movement of the assembled pig through the line or for receiving impact between pigs or shock upon impact within the pig traps. These bumpers may be of metal, rubber, or other suitable materials. Retainer plates 11 are provided with suitably registering openings for receiving bolts 15 which are provided with proper nuts for securing the assembly in operable relation. 16 is the O ring shaped outer section of my rubber element, while 17 is the web or inner section which latter is provided with openings 18 for receiving bolts 15 whereby the entire assembly may be secured in operable relation as shown in Figure 1. 19 is a metal or other suitable ring imbedded adjacent the inner diameter of the web section 17 of the rubber to reinforce the web and prevent its being dislodged from the assembly. In Figures V and VII, each opening 18 is shown provided with a metal bushing or sleeve 20.

In Figures VI and VIII preferably a biased cord structure surrounds ring 19' and extends through web 17' into O ring 16' to reinforce and strengthen the rubber parts, the holes 18' passing through the biased cord structure as shown in Fig. VIII. In Figure VI is shown an opening or void 21 in O ring section 16 whereby the latter may be made more readily distortable.

The operation is as follows: The desired number of rubber elements of selected greater outside diameter than the inside diameter of the pipe are assembled and passed into the pipe at the trap as shown being introduced thereinto in Figure I. The direction of travel is as indicated by the arrow in the respective Figures. As the assembly moves forward in the pipe the rubber elements assume substantially the shape indicated in Figure I, and as they become worn the shape indicated in Figure II becomes apparent although full sealing contact with the pipe is maintained. Further wear would bring the rubber into the approximate shape indicated in Figure III, whereupon the rubber could be reversed on the assembly or the assembly reversed whereupon shape indicated in Figure IV would be assumed, still maintaining sealing contact with the pipe and presenting further body to be worn away before seal and therefore efficiency is lost.

It will be readily understood that by reversing the direction of fluid flow in the line at any point the central or more flexible sections of the rubbers will pass through the outer or O ring sections and immediately assume the relative shapes shown and without loss of sealing engagement with the pipe. The O ring sections of the rubber may be of any desired greater diameter than the pipe when made of the proper compound and hardness to thus provide a ready and unfailing replenishment of the rubber as it may be worn away. An 18 inch O.D. of the rubber part provides an approximate 1 inch wearing away on the radius in a 16 inch pipe, whereas a 34 inch diameter rubber might be worn away in a 30 inch I.D. pipe by approximately 2 inches on the radius without losing seal or sacrificing efficiency. It is required to provide the O ring section of such section as to contain the requisite replenishment stock. It will further be understood that a proper relative resiliency of rubber sections may be employed and molded or bonded together whereby the relative distortions described are attained and such are readily used and available in molded rubber products. Also that other than O ring shapes of wearing surfaces may be used. Also that an O ring or bead might be provided near the inner diameters of the rubber sections whereby to facilitate securing of the rubber elements by the plates or that the rubber sections may be provided without central openings therein. The use of a tire cord on the bias as a reinforcing of the web portion of the rubber element lends to great and unimpeded flexibility of this section.

What I claim is:

1. A combined pig and rubber seal for use in a pipe having a cylindrical bore, said seal being attached to said pig by annular seal-securing means, said seal comprising a disc-like web having a central mounting portion engaging said seal-securing means, said mounting portion being surrounded by an annular outer flexible portion of the web, said outer portion being thin in comparison with its radial extent beyond the central portion and the seal-securing means; and a thicker outer toroidal wear portion bonded at its inner periphery to the outer periphery of said annular flexible portion of the web, said toroidal portion being of greater diameter than said bore and the seal being cupped when entered in the pipe so that the central mounting portion will be disposed on one or the other side of said toroidal portion, different wear surfaces of the toroidal portion contacting the pipe depending upon the side of the toroidal portion to which the central portion is displaced.

2. In a seal as set forth in claim 1, said toroidal portion having a continuous hollow void therewithin.

3. A combined pig and rubber seal for use in a pipe having a cylindrical bore, said seal being attached between annular plates carried by said pig which includes means for clamping said plates together to grip said seal, said seal comprising a disc-like web having a central mounting portion disposed between said plates, said mounting portion being surrounded by an annular outer flexible portion of the web, said outer portion being thin in comparison with its radial extent beyond the central portion and the plates; a thicker outer toroidal wear portion bonded at its inner periphery to the outer periphery of said annular flexible portion of the web, and reinforcement embedded in the web and bonded thereto to prevent distortion thereof outwardly of the plates, said toroidal portion being of greater diameter than said bore and the seal being cupped when entered in the pipe so that the plane of the central mounting portion will be disposed on one or the other side of said toroidal portion, different wear surfaces of the toroidal portion contacting the pipe depending upon the side of the toroidal portion to which the plane of the central portion is displaced.

4. In a combined pig and seal as set forth in claim 3, said means comprising an annular series of bolts transfixing said plates and said inner portion, and said reinforcements comprising metal sleeves lining the bolt holes in the web and bonded to the rubber.

5. In a combined pig and seal as set forth in claim 3, said seal having a centrally located aperture in said central portion, and an annular ring imbedded in the web and concentric with said aperture thereadjacent.

6. In a combined pig and seal as set forth in claim 3, said reinforcements comprising cords embedded and bonded in the web and occupying substantially radial planes.

7. In a combined pig and seal as set forth in claim 3, said reinforcements comprising fabric in the web portions and extending into the toroidal portions and disposed substantially radially.

8. In a combined pig and seal as set forth in claim 7, an annular ring embedded in the web, and said fabric passing therearound to prevent radial distortion of the fabric.

References Cited in the file of this patent

UNITED STATES PATENTS

| Re. 22,054 | Sharp | Mar. 24, 1942 |
| 186,206 | Hawley | Jan. 16, 1877 |
| 1,674,812 | Watson | June 26, 1928 |
| 1,966,819 | Irvin | July 17, 1934 |
| 2,099,723 | Carver | Nov. 23, 1937 |
| 2,198,854 | Behringer | Apr. 30, 1940 |
| 2,399,544 | Danner | Apr. 30, 1946 |
| 2,443,110 | MacClatchie | June 8, 1948 |
| 2,604,647 | Stephens | July 29, 1952 |
| 2,629,376 | Gallice | Feb. 24, 1953 |
| 2,727,471 | Martin | Dec. 20, 1955 |

FOREIGN PATENTS

| 572,055 | Great Britain | Sept. 20, 1945 |